United States Patent [19]

Kelsey et al.

[11] Patent Number: 4,777,235

[45] Date of Patent: Oct. 11, 1988

[54] PRODUCTION OF POLYARYLENE ETHER FROM ACTIVATED DIHALO BENZENOID MONOMER, DIHYDROXY BENZENOID MONOMER AND BIS(HYDROXYPHENYL) MONOMER

[75] Inventors: Donald R. Kelsey, Hillsborough; Robert A. Clendinning, New Providence; George T. Kwiatkowski, Green Brook, all of N.J.

[73] Assignee: Amoco Corporation, Chicago, Ill.

[21] Appl. No.: 68,972

[22] Filed: Jul. 1, 1987

[51] Int. Cl.[4] ............................................. C08G 65/40
[52] U.S. Cl. .................................... 528/174; 528/171; 528/210; 528/211; 528/219; 528/220; 528/226
[58] Field of Search ............... 528/174, 219, 171, 210, 528/211, 220, 226

[56] References Cited

U.S. PATENT DOCUMENTS 4,175,175  11/1979  Johnson et al. ..................... 528/219

Primary Examiner—Harold D. Anderson
Attorney, Agent, or Firm—William H. Magidson; Ralph C. Medhurst

[57] ABSTRACT

The method of preparing a thermoplastic polyarylether polymer which comprises reacting a first monomer composition comprising an activated dihalobenzenoid compound and dihydroxybenzenoid composition comprising hydroquinone, adding to the product a second monomer composition comprising a dihydroxybenzenoid composition consisting essentially of Bis-(hydroxyphenyl) compounds in a concentration of at least 50 mole percent of the total Bis-(hydroxyphenyl) compounds added in the monomer compositions and polymerizing.

17 Claims, No Drawings

PRODUCTION OF POLYARYLENE ETHER FROM ACTIVATED DIHALO BENZENOID MONOMER, DIHYDROXY BENZENOID MONOMER AND BIS(HYDROXYPHENYL) MONOMER

This invention relates to the preparation of amorphous thermoplastic polyarylether polymers which comprises reacting a first monomer composition comprising an activated dihalobenzenoid compound and dihydroxybenzenoid composition comprising hydroquinone, adding to the product a second monomer composition comprising a dihydroxybenzenoid composition consisting essentially of Bis-(hydroxyphenyl) compounds in a concentration of at least 50 mole percent of the total Bis-(hydroxyphenyl) compounds added in the monomer compositions and polymerizing. More particularly, this invention relates to the preparation of amorphous thermoplastic polyarylether sulfone polymers which comprises reacting a first monomer composition comprising dichlorodiphenyl sulfone and dihydroxybenzenoid composition comprising hydroquinone and Bisphenol S, adding to the product a second monomer composition comprising a dihydroxybenzenoid composition consisting essentially of Bis-phenol S and polymerizing.

Polyarylene polyethers are described in, for example, U.S. Pat. No. 4,175,175. This patent describes a Polymer (A) which has the following structure:

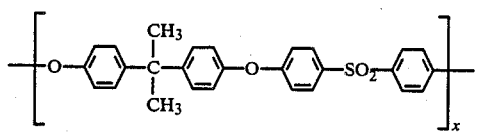

(A)

This polymer is commercially available and is a tough, rigid, high-strength thermoplastic which maintains useful properties over a wide temperature range from −150° F. to above 300° F. Polyer (A) has a good combination of mechanical properties and excellent electrical properties. Said polymer is highly resistant to mineral acids, alkali and salt solutions but can be attacked by environments such as polar organic solvents. Thus, there is a need to improve the environmental resistance, particularly the solvent resistance of Polymer (A), so that it can be used in applications where it will be exposed to an aggressive solvent environment, for example, that are found during steam sterilization containing corrosion inhibitors such as morpholine.

This patent also describes Polymer (B) having the structure:

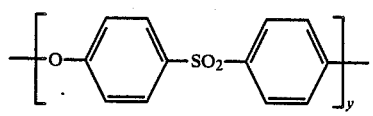

(B)

which is also commercially available. It has many properties similar to Polymer (A) except it is hygroscopic, water-crazes in steam environment and tends to crystallize from solvent in production. Further, it cannot be cast into films or moldings from some of the common solvents used for Polymer (A). Polymer (A) has a Tg of about 185° C. while Polymer (B) has a Tg of about 220° C. with the result that Polymer (A) is easier to melt fabricate while Polymer (B) has a somewhat higher use temperature.

Polymers having more desirable properties were prepared by copolymerizing dichlorodiphenyl sulfone with a dihydroxybenzenoid composition comprising from 5 to 50 mole percent hydroquinone and from 95 to 50 mole percent dihydroxydiphenyl sulfone (Bisphenol S). Subsequent studies have shown when these monomer compositions are polymerized in large reactors using the typical sulfur-containing solvents, such as sulfones or sulfoxides, in the presence of a base, such as an alkali carbonate, volatile hydroquinone can be lost and the polymer tends to discolor. Partial decomposition of hydroquinone can occur resulting in undesirable color bodies. Substantially all other aromatic diols identified below as Bis-phenol J can react in a similar manner to Bisphenol S when copolymerized with hydroquinone. Accordingly, there is a need for a reproducible method of consistantlay producing copolymers of activated dihalobenzenoid compounds, Bisphenol J and hydroquinone wherein Bisphenol J has the structure set forth below.

Bisphenol J has the structure:

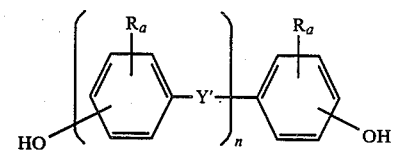

wherein Y' is a direct bond,

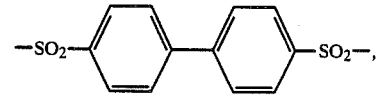

—SO₂—, —SO—, —S—, —O—,

R is independently hydrogen, halogen, $C_1$ to $C_6$ alkyl or $C_4$ to $C_8$ cycloalkyl, a is independently an integer of 0 to 4 and n is independently an integer of 1 to 3.

The general object of this invention is to provide a process of reproducibly producing polyarylethers having excellent properties. More particularly, the object of this invention is to provide a method of producing polymers by polymerization of Bisphenol J, hydroquinone and dihalobenzenoid compound. Other objects appear hereinafter.

The general object of this invention can be attained by a multi-step process of (1) reacting a composition comprising an activated dihalobenzenoid compound and dihydroxybenzenoid composition comprising hydroquinone in a molar ratio of activated dihalobenzenoid compound to dihydroxybenzenoid compound of about 0.9 to 1.1:1, (2) adding a monomer composition comprising a dihydroxybenzenoid composition consisting essentially of Bisphenol J compounds in a concentration sufficient to provide substantially equal molar concentrations of dihalobenzenoid compound and dihydroxybenzenoid compounds wherein said Bisphenol J compounds in this step constitute at least 50 mole percent of the total Bisphenol J compounds added in the monomer compositions, and (3) polymerizing. Under these conditions, the hydroquinone monomer, has less Bisphenol J to compete with in the the first step, and the remainder of Bisphenol J is added in the second step after the polymerization has been initiated. The process reduces loss of hydroquinone and minimizes color bodies because the hydroquinone is incorporated into the polymer at a faster rate than when all the monomers are polymerized together. The polymers produced in this manner have a higher second order transition temperature than Polymer (A) and are amorphous and do not have Polymer (B)'s tendency to crystallize from solution. Further, using a suitable concentration of hydroquinone and Bisphenol S, it is possible to produce a polymer having approximately the same second order transition temperature as Polymer (B).

Briefly, the polymers of this invention are formed by reacting in a first step, a monomer composition comprising an activated dihalobenzenoid compound and a dihydroxybenzenoid composition comprising a hydroquinone (hydroquinone, methylhydroquinone, etc.) and optionally Bisphenol J in a molar ratio of activated dihalobenzenoid compound to dihydroxybenzenoid compound of about 0.9 to 1.1:1 in a reaction medium comprising a base and at least one aprotic polar solvent preferably selected from the group consisting of a sulfoxide and sulfone, after the reaction is initiated, adding a monomer composition comprising dihydroxybenzenoid compounds consisting essentially of Bisphenol J compounds in a concentration sufficient to provide substantially equal molar quantities of dihalobenzenoid compound and dihydroxybenzenoid compounds wherein said Bisphenol J compounds in this step constitute at least 50 mole percent of the total Bisphenol J compounds added in the monomer compositions and polymerization to completion. Of course, the first polymerization step can be carried out in a number of stages, and the polymerization of the dihydroxybenzenoid composition consisting essentially of Bisphenol J can be carried out in several stages.

Suitable activated dihalobenzenoid compounds useful in this invention include 4,4'-bis(chlorophenyl) sulfone; 4,4'-bis(fluorophenyl) sulfone; 2,6-dichlorobenzonitrile; 4-chlorophenyl-4'-fluorophenyl sulfone; 4,4'-dichlorobenzophenone; 4,4'-difluorobenzophenone; 4,4'-bis(4-chlorophenylsulfonyl) biphenyl, etc.

The dihydroxybenzenoid compounds useful in this invention include a hydroquinone and the Bisphenol J monomers described above. Suitable Bisphenol J monomers include 4,4'-bis(hydroxyphenyl) sulfone; 4,4'-dihydroxydiphenyl; 4,4'-dihydroxybenzophenone; 4,4'-bis(hydroxyphenyl) ether; etc.

Typically, the molar ratio of hydroquinone to Bisphenol J can range from about 1:19 to 1:1, preferably 1:19 to 1:3. In the range of about 1:19 to 1:3 using only hydroquinone and Bisphenol S, polymers having about the same Tg as Polymer (B) are produced. The molar ratio of dihalobenzenoid monomer to dihydroxy monomers in the process can range from about 0.9:1 to 1.1:1, preferably about unity.

The bases useful in this invention include at least one alkali metal hydroxides (sodium hydroxide, potassium hydroxide), carbonates (sodium carbonate, sodium bicarbonate, potassium carbonate, potassium bicarbonate, cesium carbonate, etc.), acetates (sodium acetate, potassium acetate, etc.), etc. that are capable of forming a mono or di-salt with the hydroxy monomer. The overall concentration of alkali metal compound should be from about 1 to 2 equivalents of alkali metal compound per hydroxyl equivalent. A deficiency of alkali metal compound in the overall process generally leads to low molecular weight polymers.

The reaction medium preferably comprises a sulfur containing sulfoxide or sulfone which is common in this art alone or together with a hydrocarbon or halohydrocarbon which is capable of co-distilling with water. Suitable co-distillation (entrainment) agents include aromatic hydrocarbons such as benzene, toluene, xylene, ethylbenzene, chlorobenzene, etc.

The sulfur-containing solvents have the formula:

in which each $R_1$ represents a monovalent lower hydrocarbon group free of aliphatic unsaturation, which preferably contains less than about 8 carbon atoms or when connected together represents a divalent alkylene group with b being an integer from 1 to 2 inclusive. Thus, in all of these solvents all oxygens and two carbon atoms are bonded to the sulfur atom. Contemplated for use in this invention are such solvents as those having the formula:

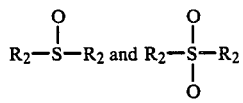

where the $R_2$ groups are independently lower alkyl, such as methyl, ethyl, propyl, butyl, and like groups, and aryl groups such as phenyl and alkylphenyl groups such as the tolyl group, as well as those where the $R_2$ groups are inter-connected as a divalent alkylene bridge such as:

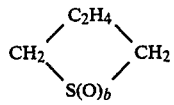

in tetrahydrothiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide Other aprotic polar solvents can be used, such as dimethyl acetamide, dimethyl formamide, N-methylpyrolidone, benzophenone, etc.

The co-distillation agent and sulfur-containing solvent can be used in a weight ratio from about 10:1 to about 1:10 preferably from about 1:1 to about 1:7.

In somewhat greater detail the polymers of this invention are produced by polymerizing a composition comprising at least one activated dihalobenzenoid compound and at least two dihydroxybenzenoid compounds in a mole ratio of hydroquinone to Bisphenol J of about 1:19 to 1:1 in a multi-stage process which comprises (1) reacting in the first stage activated dihalobenzenoid compound and from about 5 to 75 mole percent of the dihydroxybenzenoid compounds comprising 5 to 50 mole percent hydroquinone in a molar ratio of dihalobenzenoid compound to dihydroxybenzenoid compound of 0.9 to 1.1:1 to produce a product having a reduced viscosity of at least 0.05, preferably thermoplastic of at least 0.1, (2) in the second stage adding the remainder of the monomers to be polymerized comprising dihydroxybenzenoid compounds consisting essentially of Bisphenol J compounds in a concentration sufficient to provide substantially equal molar quantities of dihalobenzenoid compound and dihydroxybenzenoid compounds wherein said Bisphenol J compounds in this step constitute at least 50 mole percent of the total Bisphenol J compounds added in the monomer compositions, and (3) polymerizing same to a reduced viscosity above about 0.4. For purposes of this invention, reduced viscosity (RV) is measured as a 0.2 gm/100 ml solution in N-methylpyrrolidinone at 25° C.

In the first polymerization step, from about 5 to 75 mole percent of the aromatic diols and from about 5 to 100 mole percent of the dihalobenzenoid compound can be added to the reactor batchwide or incrementally and correspondingly from about 95 to 25 mole percent of the aromatic diols and the remainder of the dihalobenzenoid compound can be added to the reactor batchwide or incrementally and polymerized in the second step. In the first step or stage, the mole ratio of dihalobenzenoid compound to dihydroxybenzenoid compound is about 0.9 to 1.1:1. As the mole ratio increases above unity, the lower the probability of decomposition of the hydroquinone monomer, the lower the molecular weight of the reaction product formed in the first step, the more random the final polymer and the more Bisphenol J present in the first step without deleterious effect on the hydroquinone monomer.

In the second step or stage, the remainder of the dihydroxybenzenoid compound, dihalobenzenoid compound and alkali metal compound are added and the polymerization carried to completion.

Typically, the reaction medium comprising sulfur containing solvent and azeotroping agent are heated to about 120° to about 190° C. for about 0.5 to about 24 hours in the first stage and optionally raised and kept at about 160° to about 250° C. to obtain the desired degree of reaction. In the second stage of the polymerization, monomer is added and the reaction mixture is then maintained at about 120° to about 250° C. for about one to ten hours.

The reaction is carried out in an inert atmosphere such as nitrogen under atmospheric pressure, although higher or lower pressures can be used. Water is continuously removed from the reaction mass as an azeotrope so that substantially anhydrous conditions are maintained during the polymerization.

Preferably, after the desired molecular weight of the copolymer is attained, the polymer is treated with an activated aromatic halide or aliphatic halide such as methyl chloride or benzyl chloride, and the like, to convert the terminal hydroxyl groups into hydrocarbyl end groups and stabilize the polymer. Excess dihalobenzenoid compound also stabilizes the polymer.

The polymers of this invention can be blended with one or more compatible thermoplastic polymers such as polyarylates, poly(aryl ethers), polyetherimides, polyesters, aromatic polycarbonates including polyestercarbonates, polyurethanes, polyhydroxyethers.

EXAMPLE 1

In a 500 ml four neck flask fitted with a stainless steel mechanical stirrer, a thermocouple probe and a Claisen arm fitted with a nitrogen inlet tube and a distillation trap, condenser and gas bubbler, were placed hydroquinone (0.075 mole, 8.26 g), 4,4'-dichlorodiphenyl sulfone (0.1667 mole, 47.87 g), bis(4-hydroxyphenyl) sulfone (Bisphenol S, 0.0917 mole, 22.95 g), potassium carbonate (ground 0.1717 mole, 23.73 gm) 113 ml sulfolane (distilled), and 50 ml chlorobenzene. The reaction system was purged with high purity nitrogen for 30 minutes and heated to 170° C., during which time chlorobenzene began to distill off. After 30 minutes at 170° C., the reaction was heated to 230° C. After about one hour at 230° C., the reaction mixture was translucent. After an additional 25 minutes at 230° C., the heat was removed and to the reaction mixture were added 4,4'-dichlorodiphenyl sulfone (0.1333 mole, 38.28 gm), Bisphenol S (0.1333 mole, 33.36 g), potassium carbonate (0.1373 mole, 18.98 g), 88 ml sulfolane, and 25 ml chlorobenzene and the reaction mixture was heated to 230° C. After 3½ hours at 230° C., the viscous reaction mixture was diluted and the polymer was endcapped with methyl chloride and the polymer recovered. The reduced viscosity of the polymer (0.2 gm/100 ml in N-methyl-pyrrolidinone, 25° C.) was 0.62 dl/g. A polymer plaque compression molded at 380° C. exhibited good color and mechanical properties.

We claim:

1. The method of preparing a thermoplastic polyarylether polymer which comprises reacting a first monomer composition comprising an activated dihalobenzenoid compound and dihydroxybenzenoid composition comprising hydroquinone, adding to the resulting reaction product a second monomer composition comprising a dihydroxybenzenoid composition consisting essentially of at least one bis-(hydroxyphenyl) compound in a concentration of at least 50 mole percent of the total bis-(hydroxyphenyl) compound added in the monomer compositions and polymerizing.

2. The process of claim 1 wherein said dihalobenzenoid compound comprises 4,4'dichlorodiphenyl sulfone.

3. The process of claim 1 wherein said at least one bis(hydroxyphenyl) compound has the structure:

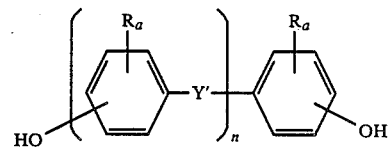

wherein Y' is a direct bond, or Y' is

—SO$_2$—, —SO—, —S—, —O—,

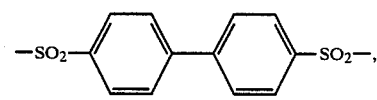

R is independently hydrogen, halogen C$_1$ to C$_6$ alkyl or C$_4$ to C$_8$ cycloalkyl, a is independently an integer of 0 to 4 and n is independently an integer of 1 to 3.

4. The process of claim 3 wherein said bis-(hydroxyphenyl) compound is 4,4'-dihydroxydiphenyl sulfone.

5. The process of claim 3 wherein said at least one bis-(hydroxyphenyl) compound is 4,4'-dihydroxybiphenyl.

6. The method of preparing a thermoplastic polyarylether polymer in a multi-stage process which comprises (1) reacting a composition comprising an activated dihalobenzenoid compound and at lesat one dihydroxybenzenoid compound comprising hydroquinone in a molar ratio of activated dihalobenzenoid compound to dihydroxybenzenoid compound of about 0.9 to 1.1:1, (2) adding a monomer composition comprising at leat one dihydroxybenzenoid compound consisting essentially of at least one bisphenol J compound in a concentration sufficient to provide substantially equal molar concentration of dihalobenzenoid compound and dihydroxybenzenoid compound wherein said at least one bisphenol J compound in this step constitutes at least 50 mole percent of the total bisphenol J added in the monomer compsitions and bisphenol J has the structure:

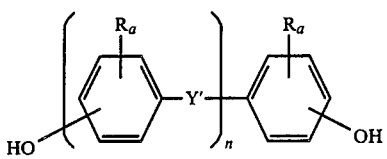

wherein Y' is a direct bond, or Y' is

—SO$_2$—, —SO—, —S—, —O—,

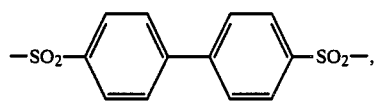

R is independently hydrogen, halogen C$_1$ to C$_6$ alkyl or C$_4$ to C$_8$ cycloalkyl, a is independently an integer of 0 to 4 and n is independently an integer of 1 to 3 and (3) polymerizing.

7. The process of claim 6 wherein said dihalobenzenoid compound comprises 4,4'dichlorodiphenyl sulfone.

8. The process of claim 6 wherein said dihalobenzenoid compound comprises 4,4'-bis(4-chlorophenylsulfonyl) biphenyl.

9. The process of claim 6 wherein said dihalobenzenoid compound comprises 4,4'-difluorobenzophenone.

10. The process of claim 6 wherein bisphenol J comprises 4,4'-dihydroxydiphenyl sulfone.

11. The process of claim 6 wherein bisphenol J comprises 4,4'dihydroxybiphenyl.

12. The method of preparing a thermoplastic polyarylether polymer in a multi-stage process which comprises polymerizing at least one activated dihalobenzenoid compound and at leat two dihydroxybenzenoid compounds in a mole ratio of hydroquinone to bisphenol J of about 1:19 to 1:1, which comprises (1) reacting in the first stage activated dihalobenzenoid compound and from about 5 to 75 mole percent of the dihydroxybenzenoid compounds comprising at least 5 to 50 mole percent hydroquinone in a molar ratio of dihalobenzenoid compound to dihydroxybenzenoid compounds of about 0.9 to 1.1:1 to produce a product having a reduced viscosity of at least 0.05, (2) in the second stage adding the remainder of the monomers to be polymerized comprising dihydroxybenzenoid composition consisting essentially of at least one bisphenol J compound in concentration sufficient to provide substantially equal molar quantities dihalobenzenoid compound and dihydroxybenzenoid compound wherein said bisphenol J compound in this step constitutes at least 50 mole percent of the total bis-phenol J compound added in the monomer compositions, and (3) polymerizing same to a reduced viscosity above about 0.4 wherein bisphenol J has the structure:

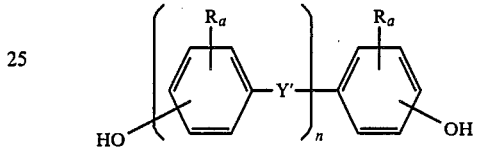

wherein Y' is a direct bond, or Y' is

—SO$_2$—, —SO—, —S—, —O—,

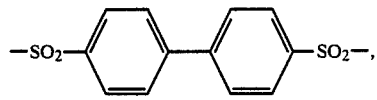

R is independently hydrogen, halogen C$_1$ to C$_6$ alkyl or C$_4$ to C$_8$ cycloalkyl, a is independently an integer of 0 to 4 and n is independently an integer of 1 to 3 and the reduced viscosity is measured as a 0.2 gm/100 ml solution in N-methylpyrrolidinone at 25° C.

13. The process of claim 12 wherein said dihalobenzenoid compound comprises 4,4'-dichlorodiphenylsulfone.

14. The process of claim 12 wherein said dihalobenzenoid compound comprises 4,4'-bis(4-chlorophenylsufonyl) biphenyl.

15. The process of claim 12 wherein said dihalobenzenoid compound comprises 4,4'-difluorobenzophenone.

16. The process of claim 12, wherein bisphenol J comprises 4,4'-dihydroxydephenyl sulfone.

17. The process of claim 12 wherein bisphenol J comprises 4,4'-dihydroxybiphenyl.

* * * * *